United States Patent Office 3,763,090
Patented Oct. 2, 1973

3,763,090
FLAME RETARDANT COMPOSITIONS OF MATTER
Henryk A. Cyba, Evanston, Ill., assignor to Universal Oil Products Company, Des Plaines, Ill.
No Drawing. Continuation-in-part of application Ser. No. 757,777, Sept. 5, 1968. This application Feb. 1, 1971, Ser. No. 111,633
Int. Cl. C09k 3/28
U.S. Cl. 260—45.8 N    9 Claims

ABSTRACT OF THE DISCLOSURE

Novel compositions of matter comprising a polymeric compound and the reaction product resulting from the reaction between a halo-substituted polyhydropolycyclic-dicarboxylic acid or anhydride thereof and an s-triazine possess desirable physical properties such as being flameproof or fire resistant.

CROSS REFERENCE TO RELATED APPLICATION

This application is a continuation-in-part of my copending application Ser. No. 757,777, filed Sept. 5, 1968, and now allowed as U.S. Pat. 3,590,042.

This invention relates to novel compositions of matter comprising a polymeric compound and the reaction product of the reaction between a halo-substituted polyhydropolycyclic-dicarboxylic acid or anhydride thereof and an s-triazine. More specifically the invention is concerned with a composition of matter which possesses certain desirable physical characteristics.

It has now been discovered that novel compositions of matter comprising, as hereinbefore set forth, a mixture of a polymeric compound and the reaction product which results from the reaction between a halo-substituted polyhydropolycyclicdicarboxylic acid or anhydride thereof and s-triazine, will possess the desirable physical characteristics of being resistant to flame or being able to retard the advance of a flame throughout the finished article. The reaction products which result when a s-triazine is reacted with a halo-substituted polyhydropolycyclicdicarboxylic acid or anhydride thereof a type hereinafter set forth in greater detail are useful as additives to plastics, polymers, copolymers, terpolymers, resins, polycondensates, elastomers, rubbers, textiles and fibers, wood and paper, both naturally occurring and synthetic in nature, coatings, paints, varnishes, leather, foams, cellulose acetate butyrate, ethyl cellulose, cellulose propionate, polyolefins such as polyethylene and polyethylene copolymers, synthetic polyethylene paper, polypropylene and polypropylene copolymers, polystyrenes, polystyrene copolymers, polyvinyl acetate or alcohol and copolymers, polyvinyl chloride and copolymers, polyvinylidene chloride and copolymers, polyesters, polyurethane, polyphenyl ethers, styrenated polyphenyl ethers, polycarbonates, polyamides, polyoxymethylenes, polyalkylene oxides such as polyethylene oxide, polyacrylates, polymethacrylates and their copolymers with styrene, butadiene, acrylonitrile, etc., epoxy resins, acrylonitrile-butadiene-styrene formulations (commonly known as ABS), polybutylene and acrylic ester-modified-styrene-acrylonitrile (ASA), etc., grafted copolymers, block copolymers especially styrene-butadiene, etc., whereby the desirable physical characteristics of flameproofing or fire retardancy will be imparted to the aforementioned materials. This particular physical characteristic will possess special advantages when preparing plastics, polymers, resins, various rubbers, textiles, etc., which will be utilized in places which may be subjected to excessive heat or to the action of a possible flame, such places including architectural panels for construction work, wall plugs for electrical connections, soundproofing material in walls, ceilings, etc., under hood automotive use, heater ducts, cable and wire coatings, TV-cabinets, appliance housing, car or airplane interior components, automotive vents, etc., boat interiors or exteriors, cushions for various vehicle seats such as airplane seats, automobile seats, bus seats, etc. In addition, the compound when utilized as a constituent of paint, lacquer, varnishes, or protective coatings, films, etc., will also impart a flame resistancy to these compounds and, therefore, render them commercially attractive as articles of commerce. Also, besides imparting the desirable physical characteristics of flame retardancy to the various articles of manufacture, the additives will render certain polymeric compositions of matter more stable to color changes and, therefore, will be important components of these compounds whenever it is desirable that discoloration of the finished product is to be avoided or will tend to render such articles unusable.

It is therefore an object of this invention to provide novel compositions of matter which possess desirable physical properties.

Another object of this invention is to provide novel compositions of matter which possess the desirable physical characteristics of flameproofing and fire retardancy when utilized in various shapes and forms.

In one aspect and embodiment of this invention is found in a composition of matter comprising a polymeric compound and the reaction product resulting from the reaction of between a halo-substituted polydropolycyclicdicarboxylic acid or anhydride thereof and an s-triazine possessing desirable physical properties such as being flame proof or fire resistant.

A specific embodiment of this invention resides in a composition of matter comprising polypropylene and 2-N-(5,6,7-8,9,9 - hexachloro-1,2,3,4,4a,5,8,8a-octahydro-5,8-methano - 2,3-naphthalenedicarboximido)-4,6-diamino-s-triazine.

Other objects and embodiments will be found in the following further detailed description of the present invention.

As hereinbefore set forth, the present invention is concerned with novel compositions of matter comprising a polymeric compound and the reaction product resulting from the reaction between a halo-substituted polyhydropolycyclicdicarboxylic acid and an s-triazine. The reaction products which are admixed with the polymeric substances are prepared by condensing a halo-substituted polyhydropolycyclicdicarboxylic acid or anhydride thereof with a triazine compound of the type hereinafter set forth in greater details, the details of the condensation being set forth in a more specific manner in a latter portion of the present specification. For purposes of this invention the term "halo-substituted" will refer to mono- and polyhalo-substituted compounds. Any suitable halo-substituted polyhydropolycyclicdicarboxylic acid or anhydride thereof may be used in the preparation of the reaction product, said acid or anhydride thereof being illustrated by the following general formulas:

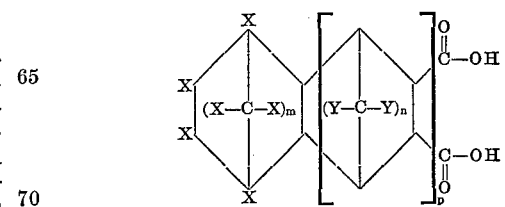

and

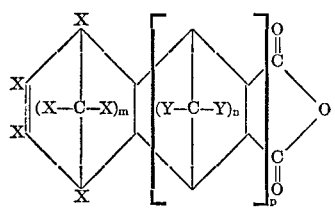

in which X is selected from the group consisting of halogen and particularly chlorine and/or bromine, and hydrogen radicals, at least two of the X's being halogen, Y is also selected from the group consisting of halogen and hydrogen radicals, $m$ is an integer of from one to two, $n$ ranges from zero to two and $p$ ranges form zero to one. Representative examples of the polyhalopolyhydropolycyclicdicarboxylic acids or anhydrides thereof which may be utilized includes 1,4,5,6,7,7-hexachlorobicyclo[2.2.1]-5-heptene-2,3-dicarboxylic acid or the anhydride thereof which may be prepared by condensing maleic acid or maleic anhydride with hexachlorocyclopentadiene. Another example of the acid or anhydride which may be used comprises 5,6,7,8,9,9-hexachloro-1,2,3,4,4a,5,8,8a-octahydro-5,8-methano-2,3-naphthalenedicarboxylic acid which is prepared by condensing a conjugated aliphatic diene such as 1,3-butadiene with maleic acid and thereafter further condensing the resultant cyclohexenedicarboxylic acid, which is 1,2,3,6-tetrahydrophthalic acid, with a halocycloalkadiene such as hexachlorocyclopentadiene to form the desired product. It is to be understood that the corresponding anhydride may be prepared by utilizing maleic anhydride as one of the starting materials in place of maleic acid. Yet another example of a polyhalopolyhydropolycyclicdicarboxylic acid or anhydride which may be used is one which is prepared by condensing cyclopentadiene with maleic acid or maleic anhydride to form norborn-5-ene-2,3-dicarboxylic acid or anhydride and thereafter condensing this product with hexachlorocyclopentadiene to form 5,6,7,8,9,9-hexachloro-1,2,3,4,4a,5,8,8a-octahydro-1,4,5,8-dimethano-2,3-naphthalenedicarboxylic acid or anhydride. It is to be understood that other starting materials may also be utilized to form similar acids or anhydrides. Illustrative examples of these starting materials include other acids as fumaric acid, itaconic acid, citraconic acid, glutaconic acid, etc.; conjugated aliphatic dienes, including 2-methyl-1,3-butadiene, 1,4-pentadiene, 1,3-hexadiene, 2,4-hexadiene, 2,3-dimethyl-1,3-butadiene, 1,3-heptadiene, 2,4-heptadiene; conjugated octadienes, nonadienes, etc.; other suitable halo-substituted cycloalkadienes which may be used include 1,2-dichlorocyclopentadiene, 1,2,3-trichlorocyclopentadiene, 1,2,3,4-tetrachlorocyclopentadiene, 1,2,3,4,5 - pentachlorocyclopentadiene and similar compounds in which all or part of the chlorine is replaced by other halogen atoms and particularly bromine.

As hereinafter set forth, the aforementioned halo-substituted polyhyropolycyclicdicarboxylic acids or anhydrides thereof are condensed with a triazine compound possessing the generic formula:

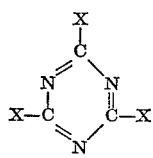

in which X is selected from the group consisting of amino, alkyl, cycloalkyl, aryl, alkylene, aralkyl, alkaryl, alkoxy, aryloxy, haloaryl and substituted amino radicals containing one of the aforementioned radicals, at least one X being amino. Some representative illustrative examples of these triazines which may be used will include 2-amino-4,6-diallyloxy-s-triazine,
2-amino-4,6-di(methoxymethyl) amino-s-triazine,
2-amino-4,6-di(ethoxymethyl)-amino-s-triazine,
2-amino-4,6-di(propoxymethyl)-amino-s-triazine,
2-amino-4,6-dicyclopentyl-s-triazine,
2-amino-4,6-dicyclohexyl-s-triazine,
2-amino-4,6-divinyl-s-triazine,
2-amino-4,6-diallyl-s-triazine,
2-amino-4,6-diphenyl-s-triazine,
2-amino-4,6-dibenzyl-s-triazine,
2-amino-4,6-di-(o-tolyl)-s-triazine,
2-amino-4,6-di-(m-tolyl)-s-triazine,
2-amino-4,6-di-(p-tolyl)-s-triazine,
2-amino-4,6-di-(p-ethylphenyl)-s-triazine,
2-amino-4,6-dimethoxy-s-triazine,
2-amino-4,6-diethoxy-s-triazine,
2-amino-4,6-dipropoxy-s-triazine,
2-amino-4,6-diphenoxy-s-triazine,
2-amino-4,6-di-(o-chlorophenyl)-s-triazine,
2-amino-4,6-di-(m-chlorophenyl)-s-triazine,
2-amino-4,6-di-(p-chlorophenyl)-s-triazine,
2-amino-4,6-di-(o-bromophenyl)-s-triazine,
2-amino-4,6-di-(m-bromophenyl)-s-triazine,
2-amino-4,6-di-(p-bromophenyl)-s-triazine;
2,4-diamino-6-chloro-s-triazine,
2,4-diamino-6-methyl-s-triazine,
2,4-diamino-6-propyl-s-triazine,
2,4-dimaino-6-hexyl-s-triazine,
2,4-diamino-6-allyl-s-triazine,
2,4-diamino-6-phenyl-s-triazine (benzoguanamine),
2,4-diamino-6-benzyl-s-triazine,
2,4-dimaino-6-m-tolyl-s-triazine,
2,4-diamino-6-p-ethylphenyl-s-triazine,
2,4-diamino-6-ethoxy-s-triazine,
2,4-diamino-6-phenoxy-s-triazine,
2,4-diamino-6-m-chlorophenyl-s-triazine,
2,4-diamino-6-o-bromophenyl-s-triazine,
2,4-diamino-6-p-bromophenyl-s-triazine;
2,6-dimaino-4-o-tolyl-s-triazine,
2,6-diamino-4-p-tolyl-s-triazine,
2,6-diamino-4-methoxy-s-triazine,
2,6-diamino-4-propoxy-s-triazine,
2,6-diamino-4-o-chlorophenyl-s-triazine,
2,6-diamino-4-p-chlorophenyl-s-triazine,
2,6-diamino-4-m-bromophenyl-s-triazine;
2,4,6-triamino-s-triazine (melamine);
2-amino-4,6-di-(methylamino)-s-triazine,
2-amino-4,6-di-(ethylamino)-s-triazine,
2-amino-4,6-di-(2-hydroxyethylamino)-s-triazine,
2-amino-4,6-di-(3-hydroxypropylamino)-s-triazine,
2-amino-4,6-di-(vinylamino)-s-triazine,
2-amino-4,6-di-(allylamino)-s-triazine,
2-amino-4,6-di-(phenylamino)-s-triazine,
2-amino-4,6-di-(benzylamino)-s-triazine,
2-amino-4,6-di-(p-tolyalmino)-s-triazine,
2-amino-4,6-di-(methoxymethylamino)-s-triazine,
2-amino-4,6-di-(ethoxymethylamino)-s-triazine,
2-amino-4,6-di-(phenoxymethylamino)-s-triazine,
2-amino-4,6-di-(p-chlorophenylamino)-s-triazine,
2-amino-4,6-di-(o-bromophenylamino)-s-triazine;
2,4-diamino-6-methylamino-s-triazine,
2,4-diamino-6-ethylamino-s-triazine,
2,4-diamino-6-vinylamino-s-triazine,
2,4-diamino-6-allylamino-s-triazine,
2,4-diamino-6-diallylamino-s-triazine,
2,4-diamino-6-methoxyphenylamino-s-triazine,
2,4-diamino-6-ethoxyphenylamino-s-triazine,
2,4-diamino-6-methoxymethylamino-s-triazine,
2,4-diamino-6-benzylamino-s-triazine;
2-amino-4,6-di-(diallylamino)-s-triazine,
2-amino-4,6-di-(dianilinoamino)-s-triazine,
2-amino-4,6-di-(ditolylamino)-s-triazine,
2-amino-4,6-di-(dibenzylamino)-s-triazine,
2-amino-4,6-di-(dimethoxymethylamino)-s-triazine,
2-amino-4,6-di(diethoxymethylanimo)-s-triazine,
2-amino-4,6-di-(di-p-methoxyphenylamino)-s-triazine, 2-amino-4,6-di-(di-p-ethoxyphenylamino)-s-triazine, 2-amino-4,6-di-(di-p-chlorophenylamino)-s-triazine, etc.

It is to be understood that the aforementioned triazines are only representative of the class of compounds which may be condensed with the aforementioned halo-substituted polyhydropolycyclicdicarboxylic acids or anhydrides thereof, and that the present invention is not necessarily limited thereto.

As hereinbefore set forth, the novel compositions of matter of the present invention are prepared by condensing a halo-substituted polyhydropolycyclicdicarboxylic acid or anhydride thereof of the type hereinbefore set forth in greater detail with a triazine compound at condensation conditions which include a temperature in the range of from about ambient (about 25° C.) up to about 250° C. or more and at a pressure which may range from atmospheric up to about 150 atmospheres or more. The preferred condensation conditions are those within the lower range hereinbefore set forth, that is, ambient temperature and atomspheric pressure. However, if elevated temperatures in the upper limit of the range previously mentioned are employed, it is contemplated that the reaction will be effected at superatmospheric pressures. These superatmospheric pressures are generated by the introduction of a substantially inert gas such as nitrogen into the reaction zone, said pressure which is used being that which is sufficient to maintain a major portion of the reactants in the liquid phase. Generally speaking, the reaction or condensation may also be effected in the presence of a substantially inert organic solvent. When utilizing a solvent, the temperature which is employed will usually be the reflux temperature of the solvent. Specific examples of the type of solvents which may be employed will include aromatic hydrocarbons such as toluene, o-xylene, m-xylene, p-xylene, ethylbenzene, etc.; aliphatic and cycloaliphatic paraffins such as n-heptane, methylcyclopentane, cyclohexane, etc.; alcohols such as methyl alcohol, ethyl alcohol, n-propyl alcohol, isopropyl alcohol, n-butyl alcohol, etc.; ethers such as dimethyl ether, diethyl ether, dipropyl ether, etc.; dioxane, various esters, chlorinated hydrocarbons, etc. The residence time during which the condensation is effected will be of a duration which is sufficient to effect a substantially complete reaction and may vary in time from about 0.5 up to about 10 hours or more, the reaction being substantially complete when the theoretical amount of water which has been formed during the condensation has been recovered. In addition, the mol ratio of halo-substituted polyhydropolycyclicdicarboxylic acid or anhydride thereof to the triazine compound will vary over a wide range depending upon the particular compound which is to be the desired product. Therefore, the mol ratio may range from 0.25 up to about 5.1 mols of halo-substituted polyhydropolycyclicdicarboxylic acid or anhydride thereof per mol of triazine compound. For example, when the desired product will comprise a monoimide of the triazine compound, the reactants will comprise a monoamino substituted triazine compound and the acid or anhydride, said reactants being present in a 1:1 molar ratio. Likewise, when the desired product will comprise a bis-N,N'-s-triazyl imide of the acid, a diamino triazine compound will be used and the acid or anhydride will be present in a molar excess ranging from at least 2:1 up to about 5:1 mols of acid or anhydride per mol of triazine compound. When a tris-N,N'N''-s-triazyl imide of a halo-substituted polyhydropolycyclicdicarboxylic acid is desired, the reactants will comprise melamine and the particular acid or anhydride, said acid or anhydride being present in a molar excess ranging from at least 3:1 up to about 5:1 mols of acid or anhydride per mol of melamine. In addition it is also contemplated that the reaction product resulting from the reaction between the triazine compound and the acid or anhydride thereof may also comprise an amide salt of the acid, said amide salt being prepared by utilizing a 1:1 mol ratio of the reactants and reaction conditions, within the lower range of the temperature and pressure reactions hereinbefore set forth. It is also contemplated that the reaction between the triazine compound and halo-substituted polyhydropolycyclicdicarboxylic acid or anhydride need not be completed, the reaction mixture or product comprising then only partial inside formation, the remaining reactants being in the form of a salt or as a physical mixture.

The aforementioned reaction products may be prepared in any suitable manner, either by a batch or continuous type operation. For example, when a batch type operation is used, to prepare the desired products, a quantity of the particular acid or anhydride and triazine compound in the desired mol ratio is placed in an appropriate apparatus along with a particular solvent, if one is desired. The apparatus which may comprise a condensation flask, is provided with heating and stirring means as well as a water trap whereby the water of reaction which is formed may be withdrawn in the event that an imide, bisimide, or trisimide is the desired product. The flask is then adjusted to the desired operating temperature and allowed to proceed for a predetermined residence time. In the event, that as hereinbefore set forth, the desired products comprise an imide, bisimide or trisimide, the time is calculated as when the theoretical amount of water has been removed. Following this, the flask and contents thereof are allowed to cool to room temperature and the reaction product is recovered. The product is then separated from any solvent which is used by conventional means such as evaporation, suction,, filtration, etc., and recovered. In the event that superatmospheric temperatures and pressures are to be used, the reactor which is employed for the batch type operation may comprise a rotating or stirred autoclave whereby the desired pressure may be attained by charging a substantially inert gas such as nitrogen to the reactor prior to heating to the desired operating temperature.

It is also contemplated within the scope of this invention that a continuous manner of operation may be employed. When such a type of operation is used, the starting material comprising the acid or anhydride of the type hereinbefore set forth in greater detail and the triazine compound are continuously charged to the reactor which is maintained at the proper operating conditions of temperature and pressure. In the event that a solvent is to be employed, one or both of the reactants may be dissolved in the solvent prior to entry into said reactor. Alternatively speaking, the solvent may be charged to the reactor in a separate stream if so desired. Upon completion of the desired residence time, the reactor effluent is continuously withdrawn. The reaction product is separated from any water from reaction which may be formed and the solvent by conventional means. In addition, the reaction product may be, if so desired, also separated from any unreacted starting material which may still be present in the reactor, the latter being recycled to form a portion of the feed stock. The desired products comprising amide salts, imides, bisimides, and trisimides are thereafter recovered, or the physical mixture of the reactants with the product or products, if so desired used as such.

While the aforementioned method of preparing the reaction products have illustrated the condensation of the halo-substituted polyhydropolycyclicdicarboxylic acid or anhydride thereof with a triazine compound containing at least one amino substituent, it is also contemplated that other processes may also be utilized. For example, the triazine compound containing at least one amino substituent may also be reacted with an unsaturated dibasic acid or anhydride thereof, thereafter adding a diolefinic hydrocarbon to the resultant compound followed by further addition with a halogenated diene. For example, maleic acid or maleic anhydride may be condensed with the triazine, then with 1,3-butadiene, followed by further addition of hexachlorocyclopentadiene to form an imide such as 2-N-(5,6,7,8,9,9-hexachloro-1,2,3,4,4a,5,8,8a-octahydro-5,8-methano - 2,3 - naphthalenedicarboximido)-4,6-diamino-s-triazine.

Examples of reaction products which may be prepared will include

2-N-(5,6,7,8,9,9-hexachloro-1,2,3,4,4a,5,8,8a-octahydro-5,8-methano-2,3-naphthalenedicarboximido)-4,6-diamino-s-triazine;

2-N-(5,6,7,8,9,9-hexachloro-1,2,3,4,4a,5,8,8a-octahydro-1,4,5,8-dimethano-2,3-naphthalenedicarboximido)-4,6-diamino-s-triazine;

2-N-(1,4,5,6,7,7-hexachlorobicyclo-[2.2.1]-5-heptene-2,3-dicarboximido)-4,6-diamino-s-triazine;

2-N-(5,6,7,8,9,9-hexachloro-1,2,3,4,4a,5,8,8a-octahydro-5,8-methano-2,3-naphthalenedicarboximido)-4,6-dimethyl-s-triazine;

2-N-(5,6,7,8,9,9-hexachloro-1,2,3,4,4a,5,8,8a-octahydro-1,4,5,8-dimethano-2,3-naphthalenedicarboximido)-4,6-dimethyl-s-triazine;

2-N-(1,4,5,6,7,7-hexachlorobicyclo-[2.2.1]-5-heptene-2,3-dicarboximido)-4,6-dimethyl-s-triazine;

2-N-(5,6,7,8,9,9-hexachloro-1,2,3,4,4a,5,8,8a-octahydro-5,8-methano-2,3-naphthalenedicarboximido)-4-phenyl-6-amino-s-triazine;

2-N-(5,6,7,8,9,9-hexachloro-1,2,3,4,4a,5,8,8a-octahydro-1,4,5,8-dimethano-2,3-naphthalenedicarboximido)-4-phenyl-6-amino-s-triazine;

2-N-(1,4,5,6,7,7-hexachlorobicyclo-[2.2.1]-5-heptene-2,3-dicarboximido)-4-phenyl-6-amino-s-triazine;

2-N-(5,6,7,8,9,9-hexachloro-1,2,3,4,4a,5,8,8a-octahydro-5,8-methano-2,3-naphthalenedicarboximido)-4,6-diphenyl-s-triazine;

2-N-(5,6,7,8,9,9-hexachloro-1,2,3,4,4a,5,8,8a-octahydro-1,4,5,8-dimethano-2,3-naphthalenedicarboximido)-4,6-diphenyl-s-triazine;

2-N-(1,4,5,6,7,7-hexachlorobicyclo-[2.2.1]-5-heptene-2,3-dicarboximido)-4,6-diphenyl-s-triazine;

2-N-(5,6,7,8,9,9-hexachloro-1,2,3,4,4a,5,8,8a-octahydro-5,8-methano-2,3-naphthalendicarboximido)-4,6-dimethoxy-s-triazine;

2-N-(5,6,7,8,9,9-hexachloro-1,2,3,4,4a,5,8,8a-octahydro-1,4,5,8-dimethano-2,3-naphthalenedicarboximido)-4,6-dimethoxy-s-triazine;

2-N-(1,4,5,6,7,7-hexachlorobicyclo[2.2.1]-5-heptene-2,3-dicarboximido)-4,6-dimethoxy-s-triazine;

2-N-(5,6,7,8,9,9-hexachloro-1,2,3,4,4a,5,8,8a-octahydro-5,8-methano-2,3-naphthalenedicarboximido)-4,6-di-(p-bromophenyl)-s-triazine;

2-N-(5,6,7,8,9,9-hexachloro-1,2,3,4,4a,5,8,8a-octahydro-1,4,5,8-dimethano-2,3-naphthalenedicarboximido)-4,6-di-(p-bromophenyl)-s-triazine;

2-N-(1,4,5,6,7,7-hexachlorobicyclo-[2.2.1]-5-heptene-2,3-dicarboximido)-4,6-di-(p-bromophenyl)-s-triazine;

2,4-bis-[N-(5,6,7,8,9,9-hexachloro-1,2,3,4,4a,5,8,8a-octahydro-5,8-methano-2,3-naphthalenedicarboximido)]-6-phenyl-s-triazine;

2,4-bis-[N-(5,6,7,8,9,9-hexachloro-1,2,3,4,4a,5,8,8a-octahydro-1,4,5,8-dimethano-2,3-naphthalenedicarboximido)]-6-phenyl-s-triazine;

2,4-bis-[N-(1,4,5,6,7,7-hexachlorobicyclo-[2.2.1]-5-heptene-2,3-dicarboximido)]-6-phenyl-s-triazine;

2,4-bis[N-(5,6,7,8,9,9-hexachloro-1,2,3,4,4a,5,8,8a-octahydro-5,8-methano-2,3-naphthalenedicarboximido)]6-phenoxy-s-triazine;

2,4-bis-[N-(5,6,7,8,9,9-hexachloro-1,2,3,4,4a,5,8,8a-octahydro-1,4,5,8-dimethano-2,3-naphthalenedicarboximido)]-6-phenoxy-s-triazine;

2,4-bis-[N-(1,4,5,6,7,7-hexachlorobicyclo-[2.2.1]-5-heptene-2,3-dicarboximido)]-6-phenoxy-s-triazine;

2,6-bis-[N-(5,6,7,8,9,9-hexachloro-1,2,3,4,4a,5,8,8a-octahydro-5,8-methano-2,3-naphthalenedicarboximido)]-4-ethyl-s-triazine;

2,6-bis-[N,(5,6,7,8,9,9-hexachloro-1,2,3,4,4a,5,8,8a-octahydro-1,4,5,8-dimethano-2,3-naphthalenedicarboximido)]-4-ethyl-s-triazine;

2,6-bis-[N-(1,4,5,6,7,7-hexachlorobicyclo-[2.2.1]-5-heptene-2,3-dicarboximido)]-4-ethyl-s-triazine;

2,4-bis-[N-(5,6,7,8,9,9-hexachloro-1,2,3,4,4a,5,8,8a-octahydro-5,8-methano-2,3-naphthalenedicarboximido)]-6-diallylamino-s-triazine;

2,4-bis-[N-(5,6,7,8,9,9-hexachloro-1,2,3,4,4a,5,8,8a-octahydro-1,4,5,8-dimethano-2,3-naphthalenedicarboximido)]-6-diallylamino-s-triazine;

2,4-bis-[N-(1,4,5,6,7,7-hexachlorobicyclo-[2.2.1]-5-heptene-2,3-dicarboximido)]-6-diallylamino-s-triazine;

2,4,6-tris-[N-(5,6,7,8,9,9-hexachloro-1,2,3,4,4a,5,8,8a-octahydro-5,8-methano-2,3-naphthalenedicarboximido)]-s-triazine;

2,4,6-tris-[N-(5,6,7,8,9,9-hexachloro-1,2,3,4,4a,5,8,8a-octahydro-1,4,5,8-dimethano-2,3-naphthalenedicarboximido)]-s-triazine;

2,4,6-tris-[N-(1,4,5,6,7,7-hexachlorobicyclo-[2.2.1]-5-heptene-2,3-dicarboximido)]-s-triazine;

2,6-bis-[N-(5,6,7,8,9,9-hexabromo-1,2,3,4,4a,5,8,8a-octahydro-5,8-methano-2,3-naphthalenedicarboximido)]-4-ethyl-s-triazine;

2,6-bis-[N-(5,6,7,8,9,9-hexabromo-1,2,3,4,4a,5,8,8a-octahydro-1,4,5,8-dimethano-2,3-naphthalenedicarboximido)]-4-ethyl-s-triazine; etc., the 4,6-diamino-s-triazine-2-N-amide of 5,6,7,8,9,9-hexachloro-1,2,3,4,4a,5,8,8a-octahydro-5,8-methano-2,3-naphthalenedicarboxylic acid;

the 4-phenyl-6-amino-s-triazine-2-N-amide of 5,6,7,8,9,9-hexachloro-1,2,3,4,4a,5,8,8a-octahydro-5,8-methano-2,3-naphthalenedicarboxylic acid;

the 4-diallylamino-6-amino-s-triazine-2-N-amide of 5,6,7,8,9,9-hexachloro-1,2,3,4,4a,5,8,8a-octahydro-5,8-methano-2,3-naphthalenedicarboxylic acid;

the 4,6-dimethyl-s-triazine-2-N-amide of 5,6,7,8,9,9-hexachloro-1,2,3,4,4a,5,8,8a-octahydro-5,8-methano-2,3-naphthalenedicarboxylic acid;

the 4,6-diphenyl-s-triazine-2-N-amide of 5,6,7,8,9,9-hexachloro-1,2,3,4,4a,5,8,8a-octahydro-5,8-methano-2,3-naphthalenedicarboxylic acid;

the 4,6-diamino-s-triazine-2-N-amide of 1,4,5,6,7,7-hexachlorobicyclo-[2.2.1]-5-heptene-2,3-dicarboxylic acid;

the 4-phenyl-6-amino-s-triazine-2-N-amide of 1,4,5,6,7,7-hexachlorobicyclo-[2.2.1]-5-heptene-2,3-dicarboxylic acid;

the 4-diallylamino-6-amino-s-triazine-2-N-amide of 1,4,5,6,7,7-hexachlorobicyclo-[2.2.1]-5-heptene-2,3-dicarboxylic acid;

the 4,6-dimethyl-s-triazine-2-N-amide of 1,4,5,6,7,7-hexachlorobicyclo-[2.2.1]-5-heptene-2,3-dicarboxylic acid;

4,6-diphenyl-s-triazine-2-N-amide of 1,4,5,6,7,7-hexachlorobicyclo-[2.2.1]-5-heptene-2,3-dicarboxylic acid; etc.

While the above illustrative examples are all drawn to hexahalo-substituted compounds, it is to be understood that amide salts, imides, bisimides, and trisimides containin less than six halogenated atoms such as the pentachloro-, pentabromo-, tetrachloro-, tetrabromo-, trichloro-, tribromo-, dichloro-, dibromo-, substituted compounds also found within the scope of this invention and are correspondingly prepared by using a pentahalo-substituted, tetrahalo-substituted, trihalo-substituted dihalo-substituted dienoic hydrocarbon as the starting material.

As hereinbefore set forth, the aforementioned amide salts, imides, bisimides, or trisimides of halo-substituted polyhydropolycyclidicarboxylic acids are composited with polymeric compounds of the type hereinbefore set forth to form the novel compositions of matter of the present invention, said polymeric compounds including plastics, resins, polymers, copolymers, textiles, naturally occurring products such as leather, wood, or paints, coatings, etc. For example, the N-imide of a halo-substituted polyhydropolycyclicdicarboxylic acid may be used as an additive to polyolefins, such as polypropylene, whereby the final product will show advantageous physical properties such as increased stability against deterioration, weathering, or aging which has been induced by chemical, physical or biological agents or radiation. In addition, the polyolefins will have a high ignition as well as a high degree of flame retardancy. The reaction product resulting from the reaction between a halo-substituted polyhydropolycyclicdicarboxylic acid or anhydride thereof and a s-triazine may be added to the polymeric compounds such as polypropylene, polyethylene, etc., in a range of from about 5%, to about 50% by weight of the polymeric material to be treated. Thereafter, it is found that the oxygen index will have been increased while the burning rate will be decreased. Examples of other polymeric compounds which may be treated with the reaction products prepared according to the process hereinbefore set forth will include epoxy resins, such as the condensation product of the epichlorohydrin and bisphenol-A. The epoxy resin in an uncured state will usually be thermoplastic and may range from low velocity liquids to high melting point brittle solids. The resins may be cured by mixing an amide salt, imide, bisimide, or trisimide of the acid with a resin and thereafter curing the mixture by a treatment at an elevated temperature for a predetermined period of time. The resultant product will have the physical characteristics thereof altered to their desirable values as pertains to color stability and flame retardancy, and thus the treated resin may be utilized for various purposes such as floor surfacing, wall surfacing, ceiling surfacing, coating, etc. In addition, some other types of polymeric compounds which may be treated of the aforementioned amide or imide will include polyphenyl ethers (polyphenylene oxides) which have been extended by treatment with styrene; polycarbonates, polyesters, polyurethane foams, phenolic resins, various elastomers, acetyl resins, copolymers such as ABS, etc.

It is also contemplated within the scope of this invention that other conventional flame retardants including, but not limited to, phosphate esters, alkyl diaryl phosphates such as octyl diphenyl phosphate, triaryl phosphates such as triphenyl phosphates, trialkyl phosphates such as tributyl phosphates, phosphonate esters, antimony compounds such as antimony oxide, barium compounds such as barium metaborate, zinc compounds such as zinc oxide, tin compounds such as tin oxide, dibutyl tin maleate, etc., may also be used in conjunction with amide salts or imides of halo-substituted polyhydropolycyclic acids to effect a synergistic action with regards to the flame retardancy of the finished product.

Some specific examples of the novel compositions of matter of the present invention comprising a polymeric compound and the reaction product resulting from the reaction between a halo-substituted polyhydropolycyclicdicarboxylic acid or anhydride thereof and as s-triazine will include polypropylene and 2-N-(5,6,7,8,9,9-hexachloro-1,2,3,4,4a,5,8,8a-octahydro-5,8-methano-2,3-naphthalenedicarboximido)-2,6-diamino-s-triazine;

polyethylene and 2-N-(5,6,7,8,9,9-hexachloro-1,2,3,4,4a,5,8,8a-octahydro-5,8-methano-2,3-naphthalenedicarboximido)-2,6-diamino-s-triazine;

ABS and 2-N-(5,6,7,8,9,9-hexachloro-1,2,3,4,4a,5,8,8a-octahydro-5,8-methano-2,3-naphthalenedicarboxido)-2,6-diamino-s-triazine;

epoxy resin and 2-N-(5,6,7,8,9,9-hexachloro-1,2,3,4,4a,-5,8,8a-octahydro-5,8-methano-2,3-naphthalenedicarboximido)-2,6-diamino-s-triazine;

polyphenylene oxide and 2-N-(5,6,7,8,9,9-hexachloro-1,2,3,4,4a,5,8,8a-octahydro-5,8-methano-2,3-naphthalenedicarboximido)-2,6-diamino-s-triazine;

polyvinyl chloride and 2-N-(5,6,7,8,9,9-hexachloro-1,2,3,4,4a,5,8,8a-octahydro-5,8-methano-2,3-naphthalenedicarboximido)-2,6-diamino-s-triazine;

rubber and 2-N-(5,6,7,8,9,9-hexachloro-1,2,3,4,4a,5,8,8a-octahydro-5,8-methano-2,3-naphthalenedicarboximido)-2,6-diamino-s-triazine;

polycarbonates and 2-N-(5,6,7,8,9,9-hexachloro-1,2,3,4,4a,5,8,8a-octahydro-5,8-methano-2,3-naphthalenedicarboximido)-2,6-diamino-s-triazine;

polyesters and 2-N-(5,6,7,8,9,9-hexachloro-1,2,3,4,4a,-5,8,8a-octahydro-5,8-methano-2,3-naphthalenedicarboximido)-2,6-diamino-s-triazine;

polyurethane foams and 2-N-(5,6,7,8,9,9-hexachloro-1,2,3,4,4a,5,8,8a-octahydro-5,8-methano-2,3-naphthalenedicarboximido)-2,6-diamino-s-triazine;

polypropylene and 2-N-(1,4,5,6,7,7-hexachlorobicyclo-[2.2.1]-5-heptene-2,3-dicarboximido)-4,6-diamino-s-triazine;

polyethylene and 2-N-(1,4,5,6,7,7-hexachlorobicyclo-[2.2.1]-5-heptene-2,3-dicarboximido)-4,6-diamino-s-triazine;

ABS and 2-N-(1,4,5,6,7,7-hexachlorobicyclo-[2.2.1]-5-heptene-2,3-dicarboximido)-4,6-diamino-s-triazine;

epoxy resin and 2-N-(1,4,5,6,7,7-hexachlorobicyclo-[2.2.1]-5-heptene-2,3-dicarboximido-4,6-diamino-s-triazine;

polyphenylene oxide and 2-N-(1,4,5,6,7,7-hexachlorobicyclo-[2.2.1]-5-heptene-2,3-dicarboximido)-4,6-diamino-s-triazine;

polyvinyl chloride and 2-N-(1,4,5,6,7,7-hexachlorobicyclo-[2.2.1]-5-heptene-2,3-dicarboximido)-4,6-diamino-s-triazine;

rubber and 2-N-(1,4,5,6,7,7-hexachlorobicyclo-[2.2.1]-5-heptene-2,3-dicarboximido)-4,6-diamino-s-triazine;

polycarbonates and 2-N-(1,4,5,6,7,7-hexachlorobicyclo-[2.2.1]-5-heptene-2,3-dicarboximido)-4,6-diamino-s-triazine;

polyesters and 2-N-(1,4,5,6,7,7-hexachlorobicyclo-[2.2.1]-5-heptene-2,3-dicarboximido-4,6-diamino-s-triazine;

polyurethane foams and 2-N-(1,4,5,6,7,7-hexachlorobicyclo-[2.2.1]-5-heptene-2,3-dicarboximido)-4,6-diamino-s-triazine;

polypropylene and 2-N-(5,6,7,8,9,9-hexachloro-1,2,3,4,4a,5,8,8a-octahydro-5,8-methano-2,3-naphthalenedicarboximido)-4-diallylamino-6-amino-s-triazine;

polyethylene and 2-N-(5,6,7,8,9,9-hexachloro-1,2,3,4,4a,5,8,8a-octahydro-5,8-methano-2,3-naphthalenedicarboximido)-4-diallylamino-6-amino-s-triazine;

ABS and 2-N-(5,6,7,8,9,9-hexachloro-1,2,3,4,4a,5,8,8a-octahydro-5,8-methano-2,3-naphthalenedicarboximido)-4-diallylamino-6-amino-s-triazine;

epoxy resin and 2-N-(5,6,7,8,9,9-hexachloro-1,2,3,4,4a-5,8,8a-octahydro-5,8-methano-2,3-naphthalenedicarboximido)-4-diallylamino-6-amino-s-triazine;

polyphenylene oxide and 2-N-(5,6,7,8,9,9,-hexachloro-1,2,3,4,4a,5,8,8a-octahydro-5,8-methano-2,3-naphthalenedicarboximido)-4-diallylamino-6-amino-s-triazine;

polyvinyl chloride and 2-N-(5,6,7,8,9,9-hexachloro-1,2,3,4,4a,5,8,8a-octahydro-5,8-methano-2,3-naphthalenedicarboximido)-4-diallylamino-6-amino-s-triazine;

rubber and 2-N-(5,6,7,8,9,9-hexachloro-1,2,3,4,4a,5,8,8a-octahydro-5,8-methano-2,3-naphthalenedicarboximido)-4-diallylamino-6-amino-s-triazine;

polycarbonates and 2-N-(5,6,7,8,9,9-hexachloro-1,2,3,4,4a,5,8,8a-octahydro-5,8-methano-2,3-naphthalenedicarboximido)-4-diallylamino-6-amino-s-triazine;

polyesters and 2-N-(5,6,7,8,9,9-hexachloro-1,2,3,4,4a,5,8,8a-octahydro-5,8-methano-2,3-naphthalenedicarboximido)-4-diallylamino-6-amino-s-triazine;

polyurethane foams and 2-N-(5,6,7,8,9,9-hexachloro-1,2-3,4,4a,5,8,8a-octahydro-5,8-methano-2,3-naphthalenedicarboximido)-4-diallylamino-6-amino-s-triazine;

polypropylene and 2-N-(5,6,7,8,9,9-hexachloro-1,2,3,4,4a,5,8,8a-octahydro-5,8-methano-2,3-naphthalenedicarboximido)-4-phenyl-6-amino-s-triazine;

polyethylene and 2-N-(5,6,7,8,9,9-hexachloro-1,2,3,4,4a, 5,8,8a-octahydro-5,8-methano-2,3-naphthalenedicarboximido)-4-phenyl-6-amino-s-triazine;

ABS and 2-N-(5,6,7,8,9,9-hexachloro-1,2,3,4,4a,5,8,8a-octahydro-5,8-methano-2,3-naphthalenedicarboximido)-4-phenyl-6-amino-triazine;

epoxy resin and 2-N-(5,6,7,8,9,9-hexachloro-1,2,3,4,4a,5, 8,8a-octahydro-5,8-methano-2,3-naphthalenedicarboximido)-4-phenyl-6-amino-s-triazine;

polyphenylene oxide and 2-N-(5,6,7,8,9,9-hexachloro-1,2, 3,4,4a,5,8,8a-octahydro-5,8-methano-2,3-naphthalenedicarboximido)-4-phenyl-6-amino-s-triazine;

polyvinylchloride and 2-N-(5,6,7,8,9,9-hexachloro-1,2,3, 4,4a,5,8,8a-octahydro-5,8-methano-2,3-naphthalenedicarboximido)-4-phenyl-6-amino-s-triazine;

rubber and 2-N-(5,6,7,8,9,9-hexachloro-1,2,3,4,4a,5,8,8a-octahydro-5,8-methano-2,3-naphthalenedicarboximido)-4-phenyl-6-amino-s-triazine;

polycarbonates and 2-N-(5,6,7,8,9,9-hexachloro-1,2,3,4, 4a,5,8,8a-octahydro-5,8-methano-2,3-naphthalenedicarboximido)-4-phenyl-6-amino-s-triazine;

polyesters and 2-N-(5,6,7,8,9,9-hexachloro-1,2,3,4,4a,5, 8,8a-octahydro-5,8-methano-2,3-naphthalenedicarboximido)-4-phenyl-6-amino-s-triazine;

polyurethane foams and 2-N-(5,6,7,8,9,9-hexachloro-1,2, 3,4,4a,5,8,8a-octahydro-5,8-methano-2,3-naphthalenedicarboximido)-4-phenyl-6-amino-s-triazine;

polypropylene and 2,4-bis-[N-(5,6,7,8,9,9-hexachloro-1,2, 3,4,4a,5,8,8a-octahydro-5,8-methano-2,3-napthalenedicarboximido)]-4-ethyl-s-triazine;

polyethylene and 2,4-bis-[N-(5,6,7,8,9,9-hexachloro-1,2, 3,4,4a,5,8,8a-octahydro-5,8-methano-2,3-naphthalenedicarboximido)]-4-ethyl-s-triazine;

ABS and 2,4-bis-[N-(5,6,7,8,9,9-hexachloro-1,2,3,4,4a,5, 8,8a-octahydro-5,8-methano-2,3-naphthalenedicarboximido)]-4-ethyl-s-triazine;

epoxy resin and 2,4-bis-[N-(5,6,7,8,9,9-hexachloro-1,2,3, 4,4a,5,8,8a-octahydro-5,8-methano-2,3-naphthalenedicarboximido)]-4-ethyl-s-triazine;

polyphenylene oxide and 2,4-bis-[N-(5,6,7,8,9,9-hexachloro-1,2,3,4,4a,5,8,8a-octahydro-5,8-methano-2,3-naphthalenedicarboximido)]-4-ethyl-s-triazine;

polyvinyl chloride and 2,4-bis-[N-(5,6,7,8,9,9-hexachloro-1,2,3,4,4a,5,8,8a-octahydro-5,8-methano, 2,3-naphthalenedicarboximido)]-4-ethyl-s-triazine;

rubber and 2,4-bis-[N-(5,6,7,8,9,9-hexachloro-1,2,3,4,4a, 5,8,8a-octahydro-5,8-methano-2,3-naphthalenedicarboximido)]-4-ethyl-s-triazine;

polycarbonates and 2,4-bis-[N-(5,6,7,8,9,9-hexachloro-1,2,3,4,4a,5,8,8a-octahydro-5,8-methano-2,3-naphthalenedicarboximido)]-4-ethyl-s-triazine;

polyesters and 2,4-bis-[N-(5,6,7,8,9,9-hexachloro-1,2,3,4, 4a,5,8,8a-octahydro-5,8-methano-2,3-naphthalenedicarboximido)]-4-ethyl-s-triazine;

polyurethane foams and 2,4-bis-[N-(5,6,7,8,9,9-hexachloro-1,2,3,4,4a,5,8,8a-octahydro-5,8-methano-2,3-naphthalenedicarboximido)]-4-ethyl-s-triazine;

polypropylene and 2,4,6-tris-[N-(5,6,7,8,9,9-hexachloro-1,2,3,4,4a,5,8,8a-octahydro-5,8-methano-2,3-naphthalenedicarboximido)]-s-triazine;

polyethylene and 2,4,6-tris-[N-(5,6,7,8,9,9-hexachloro-1,2,3,4,4a,5,8,8a-octahydro-5,8-methano-2,3-naphthalenedicarboximido)]-s-triazine;

ABS and 2,4,6-tris-[N-(5,6,7,8,9,9-hexachloro-1,2,3,4,4a, 5,8,8a-octahydro-5,8-methano-2,3-naphthalenedicarboximido)]-s-triazine;

epoxy resin and 2,4,6-tris-[N-(5,6,7,8,9,9-hexachloro-1,2,3,4,4a,5,8,8a-octahydro-5,8-methano-2,3-naphthalenedicarboximido)]-s-triazine;

polyphenylene oxide and 2,4,6-tris-[N-(5,6,7,8,9,9-hexachloro-1,2,3,4,4a,5,8,8a-octahydro-5,8-methano-2,3-naphthalenedicarboximido)]-s-triazine;

polyvinyl chloride and 2,4,6-tris-[N-(5,6,7,8,9,9-hexachloro-1,2,3,4,4a,5,8,8a-octahydro-5,8-methano-2,3-naphthalenedicarboximido)]-s-triazine;

rubber and 2,4,6-tris-[N-(5,6,7,8,9,9-hexachloro-1,2,3,4, 4a,5,8,8a-octahydro-5,8-methano-2,3-naphthalenedicarboximido)]-s-triazine;

polycarbonates and 2,4,6-tris-[N-(5,6,7,8,9,9-hexachloro-1,2,3,4,4a,5,8,8a-octahydro-5,8-methano-2,3-naphthalenedicarboximido)]-s-triazine;

polyesters and 2,4,6-tris-[N-(5,6,7,8,9,9-hexachloro-1,2, 3,4,4a,5,8,8a-octahydro-5,8-methano-2,3-naphthalenedicarboximido)]-s-triazine;

polyurethane foams and 2,4,6-tris-[N-(5,6,7,8,9,9-hexachloro-1,2,3,4,4a,5,8,8a-octahydro-5,8-methano, 2,3-naphthalenedicarboximido)]-s-triazine;

etc., polypropylene and the 4,6-diamino-s-triazine-2-N-amide of 5,6,7,8,9,9-hexachloro-1,2,3,4,4a,5,8,8a-octahydro-5,8-methano-2,3-naphthalenedicarboxylic acid;

polyethylene and the 4,6-diamino-s-triazine-2-N-amide of 5,6,7,8,9,9-hexachloro-1,2,3,4,4a,5,8,8a-octahydro-5,8-methano-2,3-naphthalenedicarboxylic acid;

ABS and the 4,6-diamino-s-triazine-2-N-amide of 5,6,7, 8,9,9-hexachloro-1,2,3,4,4a,5,8,8a-octahydro-5,8-methano-2,3-naphthalenedicarboxylic acid;

epoxy resin and the 4,6-diamino-s-triazine-2-N-amide of 5,6,7,8,9,9-hexachloro-1,2,3,4,4a,5,8,8a-octahydro-5,8-methano-2,3-naphthalenedicarboxylic acid;

rubber and the 4,6-diamino-s-triazine-2-N-amide of 5,6,7,8,9,9-hexachloro-1,2,3,4,4a,5,8,8a-octahydro-5,8-methano-2,3-naphthalenedicarboxylic acid;

polyvinyl chloride and the 4,6-diamino-s-triazine-2-N-amide of 5,6,7,8,9,9-hexachloro-1,2,3,4,4a,5,8,8a-octahydro-5,8-methano-2,3-naphthalenedicarboxylic acid, etc.

It is to be understood that the aforementioned novel compositions of matter are only representative of the class of compositions of matter which may be prepared, and that the present invention is not necessarily limited thereto.

The following examples are given to illustrate the process of the present invention which, however, are not intended to limit the generally broad scope of the present invention in strict accordance therewith.

Example I

In this experiment 127 g. (1.0 mol) of 2,4,6-triamino-s-triazine (melamine), 425 g. (1.0 mol) of 5,6,7,8,9,9-hexachloro - 1,2,3,4,4a,5,8,8a - octahydro-5,8-methano-2,3-naphthalenedicarboxylic anhydride, 2 g. of acid resins, and 800 cc. of the dimethyl ether of diethylene glycol were placed in the glass liner of a rotating autoclave. The linear was sealed in the autoclave and heated at a temperature of 200° C. for a period of 6 hours. At the end of this time, heating was discontinued, the autoclave was allowed to return to room temperature, and the reaction product was recovered. The solid crystalline material was filtered from the mother liquor dissolved in dimethyl formamide and recrystallized by the addition of water. The recrystallized material, comprising the 2-N-(5,6,7,8,9,9-hexachloro - 1,2,3,4,4a,5,8,8a - octahydro - 5,8-methano-2,3-naphthalenedicarboximido) - 4,6 - diamino-s-triazine, had a melting point of 320° C.

Calculated for $C_{16}Cl_6H_{10}N_6O_2$ (percent): Cl, 40; N, 15.73, Cl, 39.5; N, 13.89.

Example II

In this example 438 g. (1.0 mol) of 5,6,7,8,9,9-hexachloro - 1,2,3,4,4a,5,8,8a - octahydro - 1,4,5,8-dimethano-2,3-naphthalenedicarboxylic anhydride along with 800 cc. of the dimethyl ether of diethylene glycol are placed in the glass linear of a rotating autoclave. In addition, 127 g. (1.0 mole) of melamine is also added to the glass liner which is thereafter heated to a temperature of about 200° C. and maintained thereat for a period of about 6 hours. At the end of this time, the heating is discontinued, the autoclave is allowed to return to room temperature and the reaction product is recovered. The solid crystalline material which forms during the reaction is filtered from the mother liquor and dissolved in dimethyl formamide. Following this, the solid material is recrystallized by adding water to the dimethyl formamide. After separation and drying, the desired product comprising 2-N-(5,6,7,8,9,9 - hexachloro - 1,2,3,4,4a,5,8,8a - octahydro-1,4,5,8 - dimethano - 2,3-naphthalenedicarboximido)-4,5-diamino-s-triazine is recovered.

Example III

A mixture of 389 g. (1.0 mol) of 1,4,5,6,7,7-hexachlorobicyclo - [2.2.1] - 5-heptene-2,3-dicarboxylic acid, 127 g. (1.0 mol) of melamine and 800 cc. of the diethyl ether of diethylene glycol along with 2 g. of an acid resin is treated in a manner similar to that set forth in the above examples. After heating at a temperature of about 200° C. for a period of about 6 hours and thereafter cooling the autoclave, the reaction mixture is recovered. The crystalline material which is formed during the reaction is separated by filtration and dissolved in dimethyl sulfoxide. Water is added to the mother liquor and the precipitate which is formed is treated with dimethyl sulfoxide. The two precipitates of dimethyl sulfoxide are combined and treated with water to recrystallize the desired product comprising 2-N-(1,4,5,6,7,7-hexachlorobicyclo - [2.2.1] - 5-heptene-2,3-dicarboximido)-4,6-diamino-s-triazine.

Example IV

In this example 425 g. (1.0 mol) of 5,6,7,8,9,9-hexachloro - 1,2,3,4,4a,5,8,8a - octahydro - 5,8 - methano-2,3-naphthalenedicarboxylic anhydride, 63.5 g. (0.5 mol) of melamine, 800 cc. of dimethyl ether of diethylene glycol and 2 g. of an acid resin are placed in the glass liner of a rotating autoclave. The resulting mixture is heated at a temperature of about 225° C. for a period of about 6 hours. At the end of this time, the reactor and contents thereof are allowed to cool to room temperature. The crystalline material which is formed is separated from the mother liquor by filtration, the mother liquor is then treated with water to crystallize any product which may be present in said mother liquor. The two precipitates are combined and dissolved in dimethyl formamide. Following this, water is added to the dimethyl formamide to recrystallize the desired product which comprises 2,4-bis-[N - (5,6,7,8,9,9 - hexachloro - 1,2,3,4,4a,5,8,8a-octahydro - 5,8 - methano - 2,3 - naphthalenedicarboximido)]-6-amino-s-triazine.

Example V

In this example 425 g. (1.0 mol) of 5,6,7,8,9,9-hexachloro - 1,2,3,4,4a,5,8,8a - octahydro - 5,8 - methano-2,3-naphthalenedicarboxylic anhydride, 180 g. (1.0 mol) of 2-amino-4,6-di-(ethylamino)-s-triazine, 800 cc. of diethyl ether of diethylene glycol and 2 g. of an acid resin are treated in a manner similar to that set forth in the above examples. At the end of the reaction time, the reaction mixture is filtered, the mother liquor is treated with water to precipitate any additional product, the precipitates are combined dissolved in dimethyl sulfoxide and recrystallized by the addition of water. The desired product comprising 2 - N - (5,6,7,8,9,9 - hexachloro - 1,2,3,4,4a,5, 8,8a - octahydro - 5,8 - methano - 2,3-naphthalenedicarboximido)-4,6-di-(ethylamino)-s-triazine is recovered.

Example VI

A mixture of 346 g. (0.5 mol) of 5,6,7,8,9,9-hexabromo - 1,2,3,4,4a,5,8,8a - octahydro - 5,8 - methano - 2,3-naphthalenedicarboxylic anhydride, 63.5 g. of (0.5 mol) of melamine, and 800 cc. of the diethyl ether of diethylene glycol is placed in the glass liner of a rotating autoclave and heated to a temperature of about 225° C. for a period of 6 hours. At the end of this time, the reaction mixture is recovered and treated in a manner similar to that hereinbefore set forth. The desired product comprising 2-N-(5,6,7,8,9,9 - hexabromo - 1,2,3,4,4a,5,8,8a-octahydro-5,8-methano - 2,3 - naphthalenedicarboximido) - 4,6-diamino-s-triazine is recovered.

Example VII

In this example, 425 g. (1.0 mol) of 5,6,7,8,9,9-hexachloro - 1,2,3,4,4a,5,8,8a - octahydro - 5,8 - methano-2,3-naphthalenedicarboxylic anhydride, 208.2 g. (1.0 mol) of 2 - amino - 4,6 - diallyloxy-s-triazine, 800 cc. of the dimethyl ether of diethylene glycol and 2 g. of an acid resin are treated by heating the mixture to a temperature of about 180° C. for a period of 6 hours, said reaction being effected in the glass liner of a rotating autoclave and under nitrogen blanket and with polymerization inhibitor. At the end of this 6 hour period, heating is discontinued and the vessel and contents thereof are allowed to cool to room temperature. The solid crystalline material is formed during the reaction time is separated from the mother liquor by filtration. The mother liquor is then treated with water and the crystalline material which forms is also separated by filtration. The two precipitates are combined and dissolved by the addition of dimethyl formamide. Recrystallization of the material is accomplished by treating the solution with water. Following this, the recrystallized material comprising 2 - N - (5,6,7,8,9,9-hexachloro-1,2,3,4, 4a,5,8,8a - octahydro - 5,8 - methano - 2,3-naphthalenedicarboximido)-4,6-diallyloxy-s-triazine is recovered.

Example VIII

In this example 425 g. (1.0 mol) of 5,6,7,8,9,9-hexachloro - 1,2,3,4,4a,5,8,8a - octahydro - 5,8-methano-2,3-dicarboxylic anhydride were dissolved in 495 g. of the dimethyl ether of diethylene glycol along with 187 g. (1.0 mol) of 2,4 - diamino - 6 - phenyl-s-triazine. The reaction was run under a nitrogen pressure of 150 atmospheres at 180° C. in a glass liner of a three-liter autoclave. At the end of the reaction time, which consumed six hours, the reaction mixture was recovered, cooled, with the resultant appearance of a crystalline material. The crystalline material was filtered from the liquid and digested with hot methyl alcohol. Recrystallization resulted in obtaining substantially white crystals of the product which comprised 2 - N - (5,6,7,8,9,9 - hexachloro - 1,2,3,4,4a,5,8,8a-octahydro - 5,8 - methano - 2,3 - dicarboximido) - 4 - amino-6-phenyl-s-triazine. The crystals were analyzed for nitrogen content with the following results:
Calculated for $C_{22}H_{13}Cl_6N_5O_2$ (percent): N, 11.75%.
Found (percent): N, 11.14%.

Example IX

In this example 19 g. of 2 - N - (5,6,7,8,9,9-hexachloro-1,2,3,4,4a,5,8,8a - octahydro - 5,8 - methano - 2,3-dicarboximido) - 4,6 - diamino-s-triazine which was prepared according to Example I above was milled for five minutes with 81 g. of high molecular weight polypropylene and 0.5 g. of a polyhydroxy polycyclic butane oxidation inhibitor to prevent any oxidation which may occur during the milling which was conducted at a temperature of 185° C. The milled sample was pressed into strips which contained a glass cloth in the center to prevent dripping. In addition, other strips were prepared from high molecular weight propylene which did not contain any of the imide compounds. The strips were then burned in the apparatus, similar to the one described by C. P. Fenimore and J. F. Martin in the November 1966 issue of Modern Plastics. The polypropylene, which contained the N-s-triazyl imide of the halo-substituted polyhydropolycyclicdicarboxylic acid, had an oxygen index (the lowest mol fraction of oxygen which is sufficient to maintain combustion) $n=0.192$. By contrast, the polypropylene which did not contain the imide had an oxygen index $n=0.180$. Furthermore, the time to burn one inch of the polypropylene which contained the fire retardant material prepared according to Example I was 165 seconds per inch. In contrast to this, the blank polypropylene strip burned one inch in 55 seconds. This, therefore, is a graphic illustration of the substantial flameproof properties exhibited by incorporating the imide into the polypropylene.

Example X

A commercial plastic comprising ABS was milled for five minutes with an oxidation inhibitor as described in Example IX above to prevent oxidation during the milling. Strips, which were similar in nature to those described in Example IX above, were pressed and burned in a similar apparatus. The oxidation index of the blank-noninhibitor copolymer was 0.182. A similar sample of ABS containing 30% by weight of 2 - N - (5,6,7,8,9,9-hexachloro-1,2, 3,4,4a,5,8,8a - octahydro - 5,8 - methano - 2,3 - dicarboximido) - 4,6 - diamino-s-triazine has an oxygen index in excess of 0.190.

Example XI

A flame retardant composition of matter is prepared by milling 85 g. of a high molecular polypropylene, 0.5 g. of a polyhydroxypolycyclicbutane oxidation inhibitor and 15 g. of 2,4-bis-[N-(5,6,7,8,9,9-hexachloro-1,2,3,4,4a, 5,8,8a-octahydro-5,8-methano - 2,3 - naphthalenedicarboximido)]-6-amino-s-triazine, said milling being conducted at a temperature of 185° C. The milled sample is pressed into a strip in a manner similar to that set forth in Example IX above. Following this a combustion test is performed also similar to that set forth in the above example, the flame retardant composition of matter being compared to a strip of high molecular weight polypropylene which does not contain the flame retardant. It will be found that the oxygen index of the flame retardant composition of matter will be relatively higher than that of the polypropylene strip which does not contain the substituted triazine.

Example XII

In like manner a mixture comprising 80 g. of a polymer comprising polyphenylene oxide which has been modified by the addition of styrene and 20 g. of 2-N-(1,4,5,6,7,7-hexachlorobicyclo[2.2.1] - 5 - heptene-2,3-dicarboximido)-4,6-diamino-s-triazine together with 5 g. of antimony trioxide are admixed at an elevated temperature in order to insure that the mixture is homogeneous. After the mixture is poured into the mold and cooled, the resulting composition of matter, will be found to be self-extinguishing when recovered from the direct action of a flame, thus illustrating the flame retardant properties of the resulting composition of matter.

Example XIII

A liquid epoxy resin having an epoxidized equivalent weight of 190 and known in the trade as "Epon 828" is admixed with 2-N-(5,6,7,8,9,9-hexachloro-1,2,3,4,4a,5,8, 8a-octahydro - 5,8 - methano - 2,3 - naphthalenedicarboximido)-4,6-diamino-s-triazine and a curing agent comprising phthalic anhydride. The resulting mixture is then heated until it becomes homogeneous and is poured into a mold which is prepared in glass sheets using Teflon spacers. In addition, a mold release agent is also used to facilitate the removal of the resin from the molds. The molds are placed in an air-circulating oven and allowed to cool for a period of about 6 hours at a temperature of 110° C. The resulting sheets are removed from the molds and cut into strips which are evaluated for flame retardancy, said strips being compared to similar sheets which contain only the epoxy resin and the curing agent. In addition to possessing excellent heating deterioration temperature and hardness, as measured by a Shore durometer, the flame retardant composition of matter will be found to be self-extinguishing when removed from the direct action of a flame and will have a higher oxygen index than is possessed by the sheet which consists only of the epoxy resin.

I claim as my invention:

1. A composition of matter containing a polymer and a mono-, bis- or tri-imide produced by the reaction of an N-s-triazine having the formula:

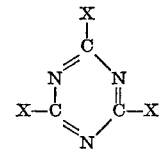

in which X is selected from the group consisting of amino, alkyl, cycloalkyl, aryl, aralkyl, alkaryl, alkoxy, aryloxy, haloaryl and substituted amino radicals containing one of the aforementioned radicals, at least one X being amino; and a halo-substituted polyhydropolycyclic-dicarboxylic acid or anhydride having the formulas

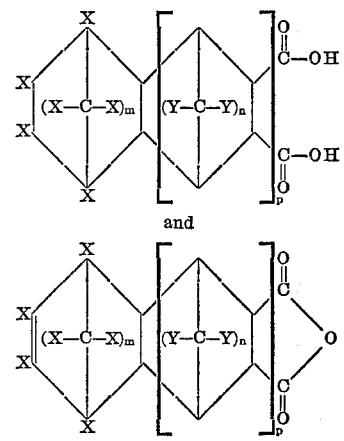

in which X is chlorine, bromine or hydrogen, at least two X's being chlorine or bromine, Y is chlorine, bromine or hydrogen, m is an integer of from one to two, n ranges from zero to two and p ranges from zero to one; said reaction being effected at condensation conditions including a temperature in the range of from about 25° C. up to about 250° C. and at a pressure of from atmospheric up to about 150 atmospheres; and, the mol ratio of said halo-substituted polyhydropolycyclic dicarboxylic acid or anhydride to said triazine being from 0.25:1 to 5:1.

2. The composition of matter as set forth in claim 1 in which said reaction product is an N-s-triazine imide.

3. The composition of matter as set forth in claim 1 in which said reaction product is an N-s-triazine bisimide.

4. The composition of matter as set forth in claim 1 in which said reaction product is present in an amount in a range of from about 5% to about 50% by weight of the composition of matter.

5. The composition of matter as set forth in claim 1 in which said polymer is acrylonitrile-butadiene-styrene copolymer and said reaction product is 2-N-(5,6,7,8,9,9-hexachloro-1,2,3,4,4a,5,8,8a-octahydro-5,8-methano - 2,3-naphthalenedicarboximido)-4,6-diamino-s-triazine.

6. The composition of matter as set forth in claim 1 in which said polymer is polypropylene and said reaction product is 2-N-(5,6,7,8,9,9-hexachloro - 1,2,3,4,4a,5,8,8a-octahydro-5,8-methano - 2,3 - naphthalenedicarboximido)-4,6-diamino-s-triazine.

7. The composition of matter as set forth in claim 1 in which said polymer is polypropylene and said reaction product is 2,4-bis-[N-(5,6,7,8,9,9-hexachloro-1,2,3,4, 4a,5,8,8a-octahydro-5,8-methano - 2,3 - naphthalenedicarboximido)]-6-amino-s-triazine.

8. The composition of matter as set forth in claim 1 in which said polymer is polyphenylene oxide and said reaction product is 2-N-(1,4,5,6,7,7 - hexachlorobicyclo-

[2.2.1] - 5 - heptene - 2,3 - dicarboximido)-4,6-diamino-s-triazine.

9. The composition of matter as set forth in claim 1 in which said polymer is an epoxy resin and said reaction product is 2-N-(5,6,7,8,9,9-hexachloro-1,2,3,4,4a,5,8,8a-octahydro - 5,8 - methano - 2,3 - naphthalenedicarboximido)-4,6-diamino-s-triazine.

References Cited
UNITED STATES PATENTS

| | | | |
|---|---|---|---|
| 3,455,950 | 7/1969 | Cyba et al. | 260—326 |
| 3,542,805 | 11/1970 | Cyba | 260—326 |
| 3,574,230 | 4/1971 | Cyba | 260—326 |
| 3,574,231 | 4/1971 | Gaydasch | 260—326 |
| 3,576,784 | 4/1971 | Gloor | 260—45.75 |
| 3,590,042 | 6/1971 | Cyba | 260—249.6 |
| 3,440,248 | 4/1969 | Roberts et al. | 260—326 |

DONALD E. CZAJA, Primary Examiner

R. A. WHITE, Assistant Examiner

U.S. Cl. X.R.

106—15 FP; 252—8.1